Patented June 5, 1934

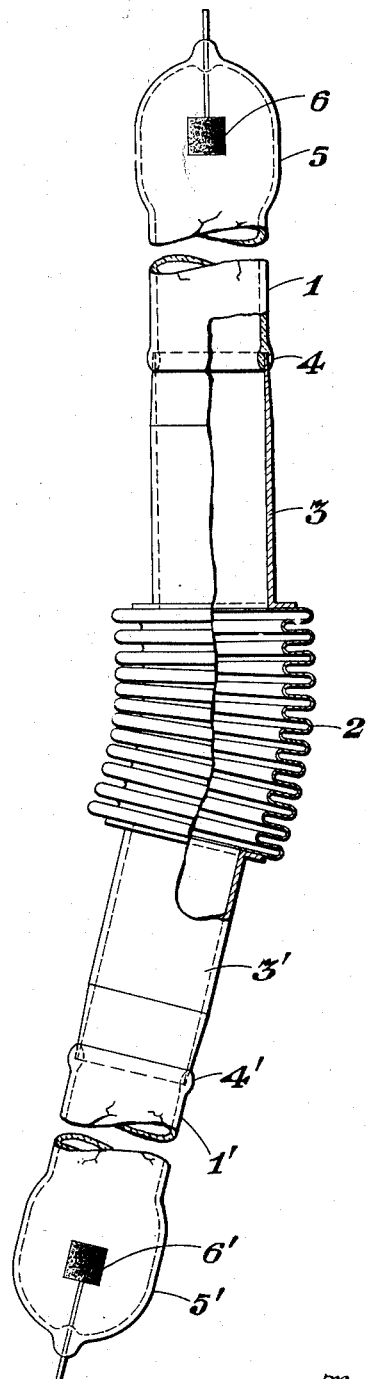

1,961,709

UNITED STATES PATENT OFFICE 1,961,709

GASEOUS ELECTRIC DISCHARGE DEVICE

Marcello Pirani, Berlin-Wilmersdorf, Germany, assignor to General Electric Company, a corporation of New York Application February 14, 1933, Serial No. 656,711
In Germany March 7, 1932

3 Claims. (Cl. 176—122)

The present invention relates to gaseous electric discharge devices generally and more particularly the invention relates to means for making the elongated tubular containers of such devices more flexible than those now known in the art.

It is well known in the art that the temperature of elongated, tubular containers of gaseous electric discharge lamp devices, particularly those having a gaseous filling comprising a metal vapor, is subject to wide temperature changes and that their temperature is frequently as high as several hundred degrees Celsius during the operation of the device. The containers expand in diameter and length under this heat and while this is not of great disadvantage in comparatively short containers there is grave danger of breakage in long containers due to the building up of physical strains by expansion under the high temperature thereof. The weight of the container itself is sometimes sufficient to break it.

The object of the present invention is to provide a means whereby the danger of fracturing the walls of the container of a gaseous electric discharge lamp device due to physical strains, whether caused by the high temperature of the container during the operation of the device, or by the weight of the container itself, or by physical shocks, is reduced to a minimum. Still further objects and advantages attaching to the device and to its use and operation will be apparent to those skilled in the art from the following particular description.

The invention attains its object by fusing a metal tube having flexible, corrugated walls into the walls of two glass tubular sections making up the container of a gaseous electric discharge device. The flexible tube part of said container permits the two glass sections to expand or contract freely in response to temperature changes which reduces the physical strain on said glass sections to a minimum.

In the drawing accompanying and forming part of this specification an embodiment of the invention is shown in an elevational, partly sectional view.

Referring to the drawing the new and novel gaseous electric discharge lamp device comprises a container having two tubular glass sections 1 and 1'. Electrode chambers 5 and 5' having electrodes 6 and 6' are fused to said glass sections 1 and 1' respectively. Said glass sections 1 and 1' are broken to indicate that they are of greater length than that indicated in the drawing. A metal tube, made of spring-steel or bronze, for example, connects said glass sections 1 and 1'. The midsection 2 of said metal tube has corrugated walls and the end sections 3 and 3' thereof have smooth sided walls. The ends of said sections 3 and 3' are thin and are fused into the thickened ends 4 and 4' of the glass sections 1 and 1' respectively to make a strong, gas tight joint therewith. The container of the lamp device has a gaseous atmosphere therein which is excited to luminescence by an electric discharge between said electrodes 6 and 6' respectively. The gaseous atmosphere comprises neon, or a mixture of argon and mercury vapor, for example.

A container having the above structure can be bent, or straight, as desired, and the bent or straight shape can be given to said container either before or after the manufacture of the gaseous electric discharge device. The flexible section 2 of the container permits free expansion and contraction of the container in response to temperature changes to avoid the danger of breakage of the container. The flexibility of the container also enables it to withstand many physical shocks of such strength as would break the container were it inflexible.

It will be understood, of course, that as many flexible tube parts as desired can be used in a container to extend said container to a desired length and that almost the entire length of the metal tube can have flexible corrugated walls, with the exception, of course, of the end parts thereof fused into the glass sections 1 and 1'.

What I claim as new and desire to secure by Letters Patent of the United States is:—

1. An electric discharge lamp device comprising an elongated glass container, electrodes sealed in the respective ends thereof, a gaseous atmosphere therein, said container having a flexible, metal section along the length thereof and intermediate said electrodes.

2. A gaseous electric discharge lamp device comprising a container, electrodes sealed therein, a gaseous atmosphere therein, said container consisting of a plurality of glass tubes surrounding the discharge path between said electrodes and a tube having corrugated walls interposed between and joining the adjacent ends of said glass tubes.

3. A gaseous electric discharge lamp device comprising a container, electrodes sealed therein, a gaseous atmosphere therein, said container consisting of a plurality of glass tubes surrounding the discharge path between said electrodes and a metal tube having corrugated walls interposed between and joining the adjacent ends of said glass tubes.

MARCELLO PIRANI.